(12) United States Patent
Dudar

(10) Patent No.: US 9,541,024 B2
(45) Date of Patent: Jan. 10, 2017

(54) FUEL LEVEL INDICATION NOISE MONITOR

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 14/661,609

(22) Filed: Mar. 18, 2015

(65) Prior Publication Data

US 2016/0273473 A1 Sep. 22, 2016

(51) Int. Cl.

| G01F 25/00 | (2006.01) |
|---|---|
| F02D 41/22 | (2006.01) |
| G01F 23/30 | (2006.01) |
| F02D 41/04 | (2006.01) |
| F16K 31/06 | (2006.01) |
| F02D 41/24 | (2006.01) |

(52) U.S. Cl.
CPC ............ F02D 41/222 (2013.01); F02D 41/04 (2013.01); F16K 31/06 (2013.01); G01F 23/303 (2013.01); G01F 25/0061 (2013.01); F02D 41/22 (2013.01); F02D 41/2451 (2013.01)

(58) Field of Classification Search
CPC .... F02D 41/22; F02D 41/222; F02D 41/2451; F02D 2041/224; G01F 25/0061; G01F 25/0076; G01F 23/00; G01F 23/303; G01F 23/36; G01F 23/30; G01F 22/00; G01F 22/02

See application file for complete search history.

(56) References Cited

U.S. PATENT DOCUMENTS

| 4,450,820 | A | * | 5/1984 | Haynes | F02D 33/006 123/514 |
|---|---|---|---|---|---|
| 5,394,341 | A | | 2/1995 | Kepner | |
| 5,483,109 | A | | 1/1996 | Gholston | |
| 7,158,866 | B2 | * | 1/2007 | Gustafsson | B60C 23/061 701/1 |
| 8,739,766 | B2 | | 6/2014 | Jentz et al. | |
| 2004/0267435 | A1 | * | 12/2004 | Fujimoto | F02M 25/0809 701/107 |

(Continued)

FOREIGN PATENT DOCUMENTS

| DE | 19836102 A1 | 2/2000 |
|---|---|---|
| JP | 4310826 B2 | 8/2009 |

OTHER PUBLICATIONS

Anonymous, "Vehicle Tow Detection for EVAP Monitor Robustness," IPCOM No. 000233591, Published Dec. 17, 2013, 2 pages.

*Primary Examiner* — Thomas Moulis
(74) *Attorney, Agent, or Firm* — James Dottavio; Alleman Hall McCoy Russell & Tuttle LLP

(57) ABSTRACT

Methods and systems are provided for monitoring fuel level indicator noise in a sealed fuel tank system. In one example, the method includes comparing the outputs of a fuel level indicator and fuel tank pressure sensor in a sealed tank. If the outputs of both the fuel level indicator and the fuel tank pressure sensor outputs are noisy, then it may be determined that the fuel level indicator noise is mechanical in nature. However, if the fuel level indicator output is noisy while the fuel tank pressure sensor output is not noisy in the sealed tank, then it may be determined that the fuel tank pressure sensor noise is electrical in nature.

20 Claims, 4 Drawing Sheets

(56) References Cited

U.S. PATENT DOCUMENTS

| | | | |
|---|---|---|---|
| 2005/0072206 A1* | 4/2005 | Cho | G01F 25/0061 73/1.73 |
| 2010/0236638 A1 | 9/2010 | Streib | |
| 2014/0257668 A1 | 9/2014 | Jentz et al. | |
| 2014/0257721 A1* | 9/2014 | Thompson | G01M 3/226 702/51 |
| 2014/0260576 A1* | 9/2014 | Sweppy | G01F 23/32 73/114.54 |
| 2014/0330482 A1* | 11/2014 | Yang | G07C 5/00 701/34.4 |
| 2015/0276457 A1* | 10/2015 | Dudar | G01F 23/18 73/290 R |
| 2016/0082832 A1* | 3/2016 | Dudar | B60K 15/077 206/459.1 |

* cited by examiner

FUEL LEVEL INDICATION NOISE MONITOR

FIELD

The present description relates generally to methods and systems for monitoring fuel level indicator noise in a sealed fuel tank system.

BACKGROUND/SUMMARY

Fuel level indicators may be coupled to a fuel tank of an engine system to signal the level of fuel contained in the fuel tank. As such, since various engine controls are based on the amount of fuel available in the engine, an accurate fuel level estimate may be required to enable engine performance to be optimized. Accordingly, diagnostic tests may be periodically performed on the fuel level indicator. If the fuel level indicator output is noisy, the output may not be relied on and a diagnostic code may be set to indicate potential sensor degradation.

However the inventors have recognized that fuel level indicator noise may occur due to various reasons. For example, the noise may be electrical noise arising from a degraded electrical component (e.g., faulty wiring or degraded sensor). As another example, the noise may be mechanical noise arising from sloshing of fuel in the fuel tank due to driving conditions and/or road conditions. Since a diagnostic code is set irrespective of whether the noise is electrical or mechanical, there may be conditions where the noise is transient due to fuel slosh but degradation (and replacement) of the fuel level indicator is nonetheless recommended. As such, this may lead to expensive false warranty issues and customer dissatisfaction.

The inventors herein have recognized that a fuel tank pressure sensor response is magnified during fuel sloshing in a sealed fuel system due to the generation of additional fuel vapors. Therefore, based on correlations between a fuel tank pressure response and a fuel level indicator response in a sealed fuel system, electrical noise may be better differentiated from mechanical noise. In one example, fuel level indicator noise may be addressed by a method for an engine fuel system comprising indicating degradation of a fuel tank fuel level indicator based on each of a fuel level indicator output and a fuel tank pressure sensed in a sealed fuel tank system.

For example, in response to any indication of fuel level indicator noise, an active test may be performed to identify the origin (electrical or mechanical) of the noise. Therein, the fuel system may be sealed, such as by closing a canister vent valve. A fuel tank pressure response in the sealed fuel system may then be compared to the fuel level indicator response. If the fuel level indicator noise correlates with fuel tank pressure fluctuations (e.g., both the fuel level indicator and the pressure sensor are noisy), the indicator noise may be attributed to mechanical noise from fuel slosh. In this case, no diagnostic code is set since the fuel level sensor is not degraded. In comparison, if the fuel level indicator noise does not correlate with fuel tank pressure fluctuations (e.g., the fuel level indicator is noisy but the pressure sensor is not), the noise may be attributed to electrical noise. In this case, a diagnostic code is set since the fuel level sensor may need replacement.

In this way, fuel level indicator noise may be more accurately and reliably identified based on correlations between fuel level indicator noise and fuel tank pressure noise in a sealed fuel system. By relying on the magnification of a fuel tank pressure response during fuel slosh, fuel level indicator mechanical noise may be better distinguished from electrical noise. By appropriately setting a diagnostic code only responsive to electrical noise and not responsive to mechanical noise, false warranty issues may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
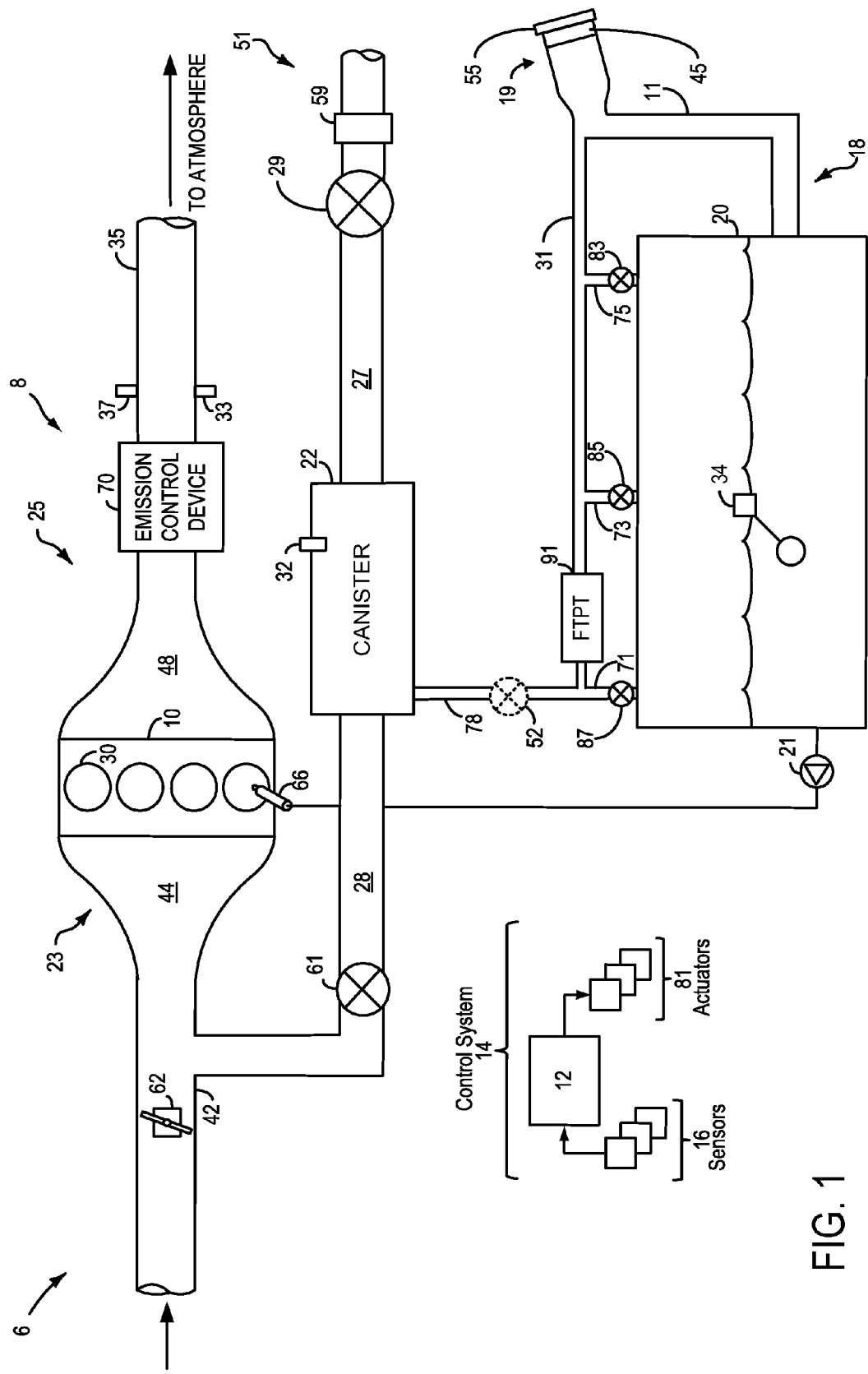
FIG. 1 shows a schematic depiction of a fuel system coupled to an engine system.
Figure 3:
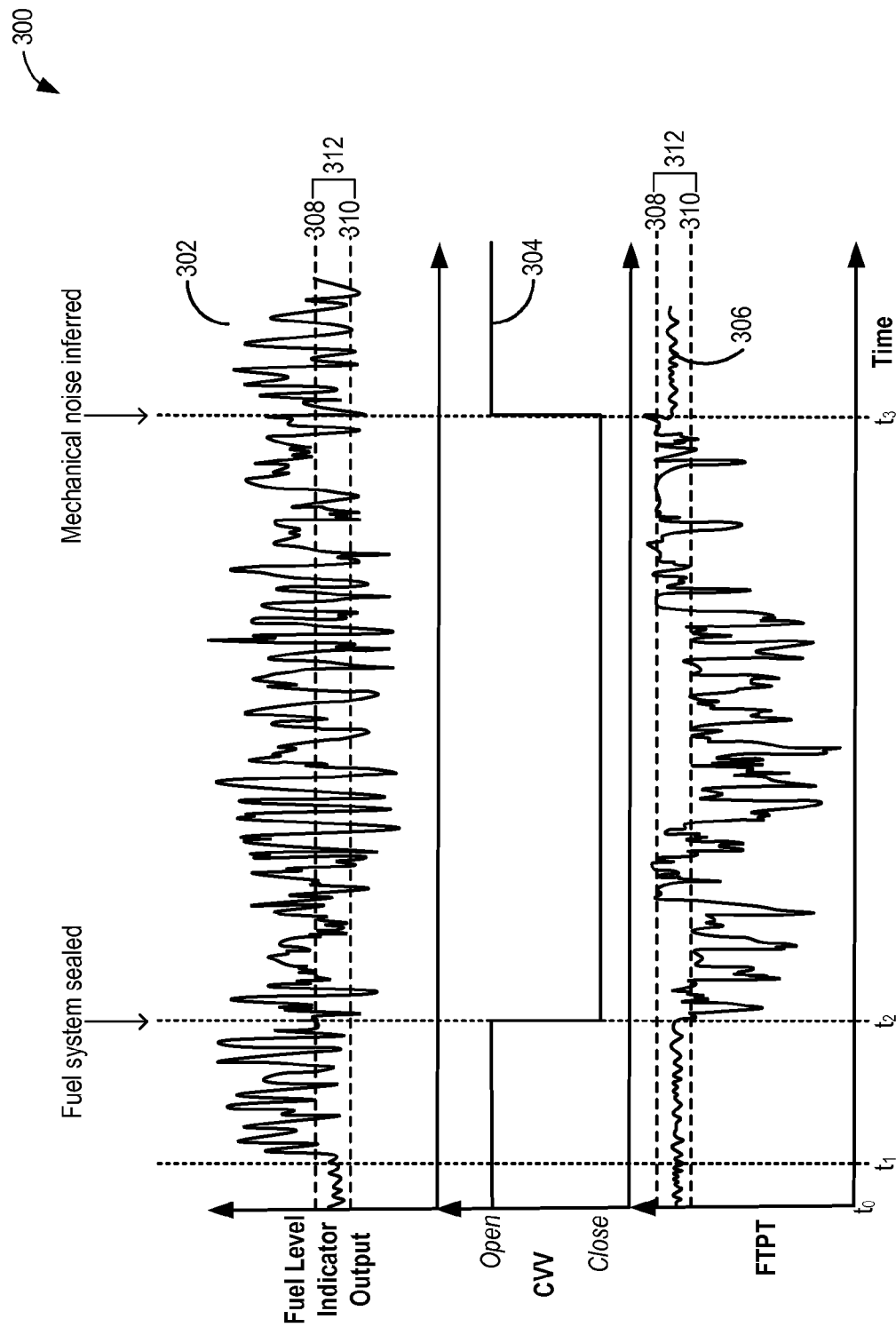
FIG. 3 shows an example relationship between a fuel level indicator output and a fuel tank pressure sensor output when the fuel level indicator noise is a mechanical noise.
Figure 4:
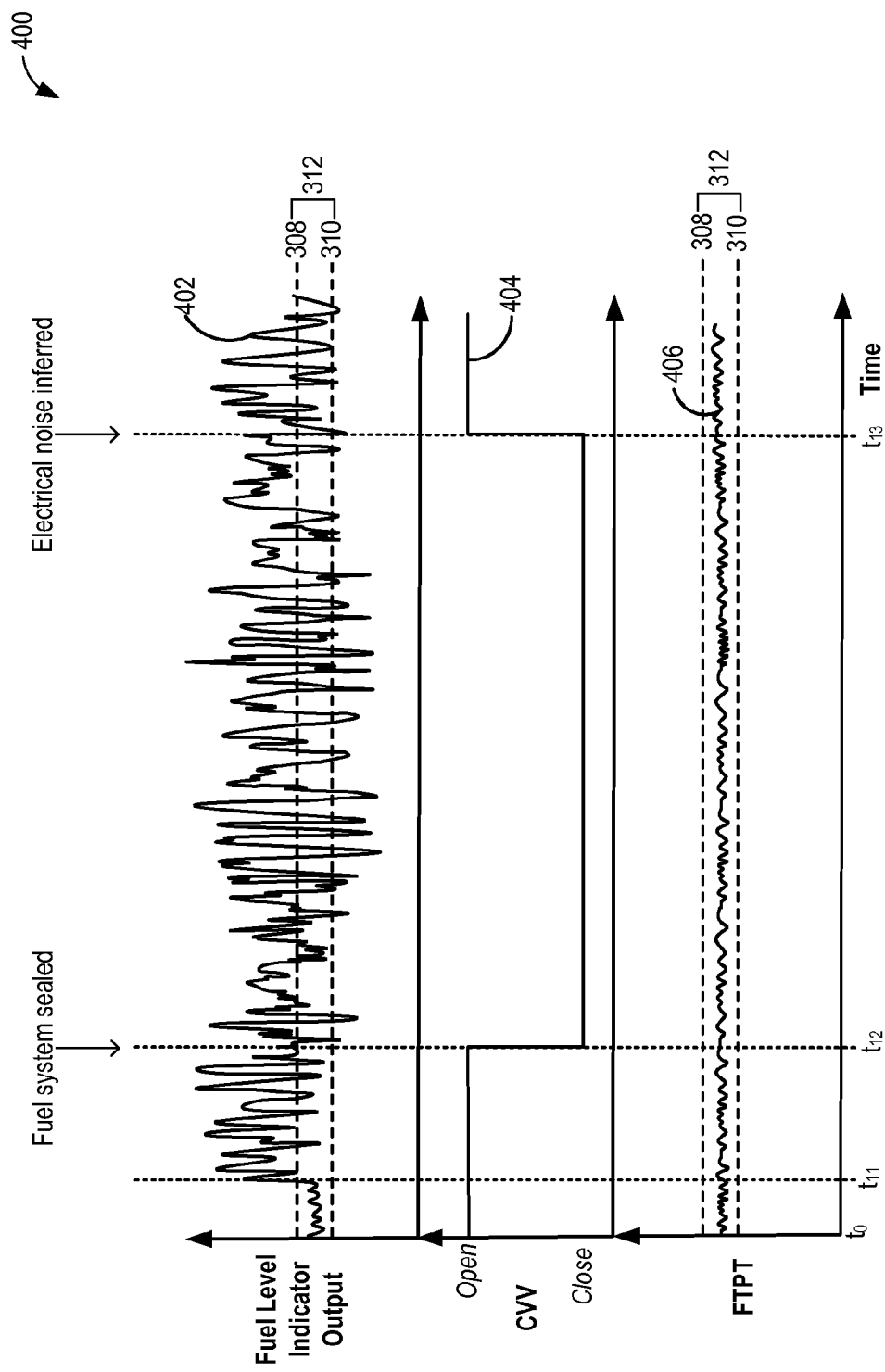
FIG. 4 shows an example relationship between a fuel level indicator output and a fuel tank pressure sensor output when the fuel level indicator noise is an electrical noise.

The following description relates to systems and methods for monitoring a fuel level indicator noise in a sealed fuel tank system, such as in a fuel system coupled in an engine system, such as the engine system of FIG. 1. A controller may be configured to perform a control routine, such as the routine of FIG. 2, to determine if a noise in a fuel level indicator output is mechanical or electrical in nature by comparing the outputs of the fuel level indicator and the fuel tank pressure sensor in a sealed tank. An example timeline depicting the changes in the outputs of the fuel level indicator and a fuel tank pressure sensor in a sealed tank when the noise in the fuel level indicator is mechanical is shown in FIG. 3. An example timeline depicting the changes in the outputs of a fuel level indicator and a fuel tank pressure sensor in a sealed tank when the noise in the fuel level indicator is electrical is shown in FIG. 4. In this way, by determining the nature of the noise in the fuel level indicator, a diagnostic code may be set only responsive to electrical noise and not responsive to mechanical noise, and false warranty issues may be reduced.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof.

A fuel level sensor or indicator 34 located in fuel tank 20 may provide an indication of the fuel level ("Fuel Level Input") to controller 12. As depicted, fuel level indicator 34 may comprise a float connected to a variable resistor. The output of the fuel level indicator 34 may provide an estimate of the amount of fuel stored in the fuel tank. The output of the fuel level indicator 34 may be used to control engine operation parameters such as fuel injection amount, exhaust gas recirculation, canister purging, and refueling for example. However the output of the fuel level indicator may be noisy if there are any fluctuations or sudden and frequent changes in the fuel level indicator output. The fluctuations or noise in the output of the fuel level indicator may be electrical, for example arising due to a degradation of the fuel level indicator (e.g., faulty wiring, faulty sensor, faulty electrical connection, etc.) or mechanical, for example arising due to fuel slosh in the fuel tank. If a diagnostic code is set responsive to noise, irrespective of whether the noise is electrical or mechanical, there may be warranty issues. As elaborated with reference to FIG. 2, electrical noise may be distinguished from mechanical noise based on correlations between fuel level indicator noise and fuel tank pressure during selected conditions. Proper identification of the source of noise of fuel level indicator allows expensive false warranty issues and customer dissatisfaction issues to be reduced.

Vapors generated in fuel system 18 may be routed to an evaporative emissions control system 51, which includes a fuel vapor canister 22, via vapor recovery line 31, before being purged to the engine intake 23. Vapor recovery line 31 may be coupled to fuel tank 20 via one or more conduits 71, 73 and 75 and may include one or more valves for isolating the fuel tank during certain conditions. Further, in some examples, one or more fuel tank vent valves 87, 85 and 83 may be included in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include another grade vent valve (GVV) 83. Further, in some examples, recovery line 31 may be coupled to a fuel filler system 19. In some examples, fuel filler system may include a fuel cap 55 for sealing off the fuel filler system from the atmosphere. Refueling system 19 is coupled to fuel tank 20 via a fuel filler pipe or neck 11.

Further, refueling system 19 may include refueling lock 45. In some embodiments, refueling lock 45 may be a fuel cap locking mechanism or a filler pipe valve located at a mouth of fuel filler pipe 11 or a refueling door lock. The refueling lock 45 may be unlocked by commands from controller 12, for example, when a fuel tank pressure decreases below a pressure threshold or may be unlocked via a pressure gradient, for example, when a fuel tank pressure decreases to atmospheric pressure.

The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 20, the vent valves may be open or closed. For example, GVV 87 may be normally open allowing for diurnal and "running loss" vapors from the fuel tank to be released into canister 22, preventing over-pressurizing of the fuel tank. However, during vehicle operation on an incline, when a fuel level as indicated by fuel level indicator 34 is artificially raised on one side of the fuel tank, GVV vent valve 87 may close to prevent liquid fuel from entering vapor line 31. As another example, FLVV 85 is normally open, however during fuel tank refilling, vent valve 85 may close, causing pressure to build in line 31 as well as at a filler nozzle coupled to the fuel pump. The increase in pressure at the filler nozzle may then trip the refueling pump, stopping the fuel dill process automatically, and preventing overfilling.

For example, during vehicle maneuvers such as a sweeping left turns or right turns (e.g., vehicle turns at speeds that are higher than a threshold speed and/or vehicle turns at higher than threshold turn speeds), uphill vehicle travel (e.g., vehicle travel along an incline that is higher than a threshold grade), and travel along a bumpy road (e.g., vehicle travel along a track having a lower than threshold smoothness), fuel can slosh. Still other maneuvers that may cause fuel sloshing include vehicle travel along undulating track surfaces, aggressive braking maneuvers, and vehicle acceleration along any axis. However, these conditions are temporary; hence the noise that may result due to fuel sloshing may be transient. When the road and/or driving conditions return to normal, the noise in the fuel level indicator as a result of the fuel sloshing may disappear. If a diagnostic code is set responsive to the indication of any FLI noise, and if the noise is mechanical in nature, replacement of the FLI may be recommended even though the sensor is not degraded. As such, this may result in a false warranty issue. In comparison, the electrical noise in the fuel level indicator may be due degradation of the fuel level indicator, and during this condition, setting of a diagnostic code may be valid. Hence the inventors have developed a method to distinguish between mechanical and electrical noise in the fuel level indicator output. As elaborated below and with reference to FIGS. 2-4, engine control systems may be configured to identify the nature of the noise in the fuel level indicator. In other words, it may be determined if the noise is a mechanical noise due to fuel slosh or an electrical noise due to a degraded fuel level indicator (or indicator component). This reduces the likelihood of false degradation detection and improves vehicle fuel system warranties.

Emissions control system 51 may include one or more emissions control devices, such as one or more fuel vapor canisters 22 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include a canister ventilation path or vent line 27 which may route gases out of the canister 22 to the atmosphere when storing, or trapping, fuel vapors from fuel system 18.

Vent line 27 may also allow fresh air to be drawn into canister 22 when purging stored fuel vapors from fuel system 18 to engine intake 23 via purge line 28 and purge valve 61. For example, purge valve 61 may be normally closed but may be opened during certain conditions so that vacuum from engine intake manifold 44 is provided to the fuel vapor canister for purging. In some examples, vent line 27 may include an air filter 59 disposed therein upstream of a canister 22.

Flow of air and vapors between canister 22 and the atmosphere may be regulated by a canister vent valve 29. In some embodiments, such as in hybrid-electric vehicles, fuel tank 20 may be coupled to canister 22 via fuel tank isolation valve 52. Canister vent valve (CVV) 29 may be a normally open valve. Operation of CVV 29 may be adjusted via a canister vent solenoid coupled to the valve. Energizing of the solenoid by an engine controller may enable the CVV to be closed, thereby sealing the fuel tank. De-energizing of the solenoid may enable the CVV to be opened. Fuel vapors may then be vented to atmosphere via the canister vent valve 29, or purged to engine intake system 23 via canister purge valve 61. When included, the fuel tank isolation valve 52 (FTIV) may be closed to seal the fuel tank 20 from the atmosphere and may be opened to vent fuel tank vapors to canister 22.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open the canister vent valve 29 while closing canister purge valve (CPV) 61 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open the canister vent valve 29, while maintaining the canister purge valve 61 closed, to depressurize the fuel tank before allowing enabling fuel to be added therein.

As yet another example, the fuel system may be operated in a canister purging mode (e.g., after an emission control device light-off temperature has been attained and with the engine running), wherein the controller 12 may open the canister purge valve 61 and the canister vent valve 29. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

As elaborated herein, during selected conditions, the fuel system may be operated in a diagnostic mode to identify a source of fuel level indicator noise. The canister vent valve 29 may be closed to seal the fuel tank system. In a sealed tank system, the output of the fuel tank pressure sensor may be magnified. This magnified output may be compared to the fuel level indicator output and the two outputs may be correlated to determine if the fuel level indicator noise is mechanical or electrical as explained below.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 37 located upstream of the emission control device, temperature sensor 33, pressure sensor 91, fuel level indicator 34, and fuel tank pressure sensor 91. Other sensors such as pressure, temperature, air/fuel ratio, and composition sensors may be coupled to various locations in the vehicle system 6. As another example, the actuators may include fuel injector 66, canister vent valve 29, throttle 62, pump 92, and refueling lock 45. The control system 14 may include a controller 12. The controller may receive input data from the various sensors, process the input data, and trigger the actuators in response to the processed input data based on instruction or code programmed therein corresponding to one or more routines. One example routine is shown with reference to FIG. 2 where the method allows degradation of a fuel tank fuel level indicator to be indicated based on each of a fuel level indicator output and a fuel tank pressure sensed in a sealed fuel tank system, thereby allowing fuel level indicator noise to be accurately and reliably determined.

Figure 2:
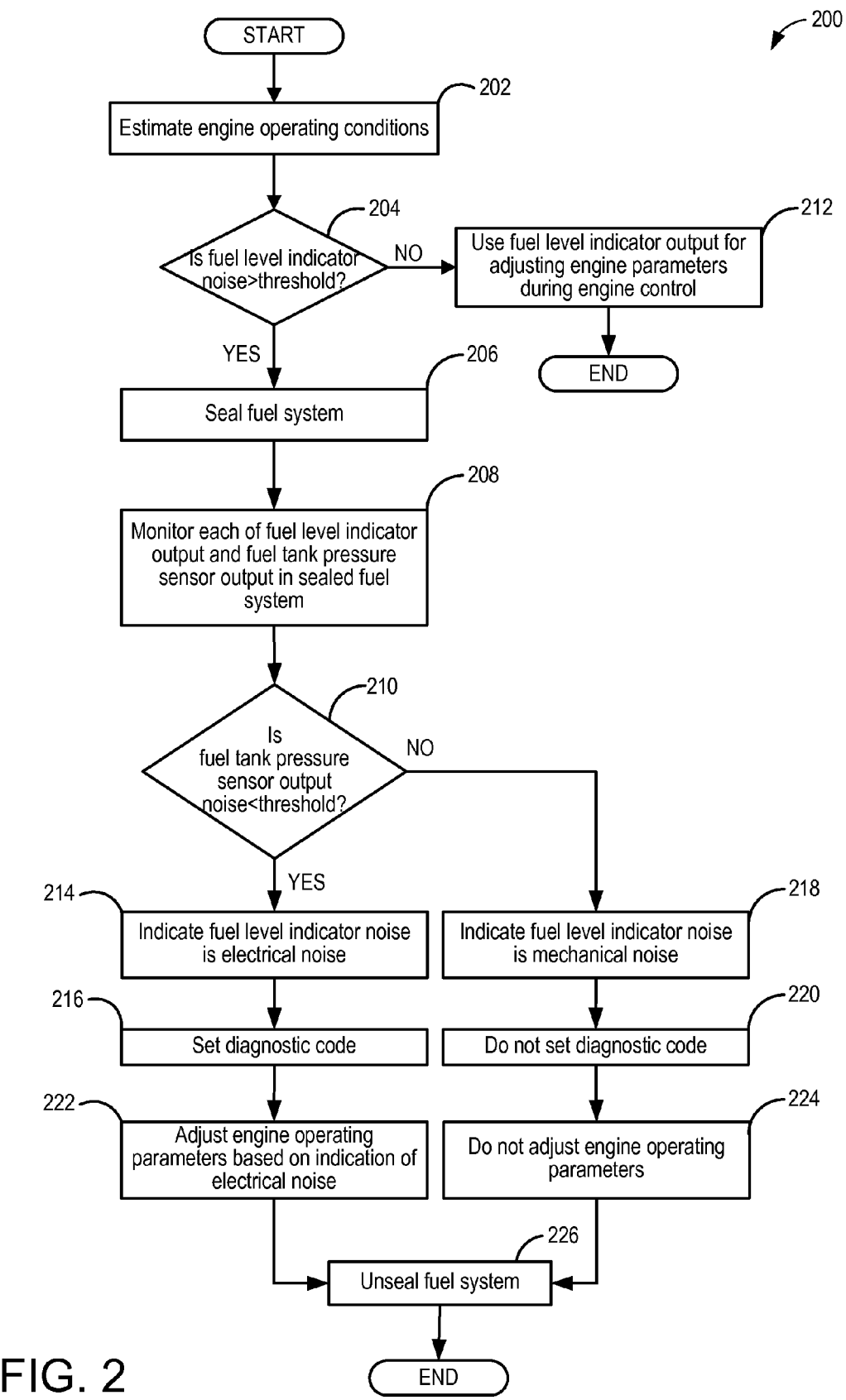
FIG. 2 shows a high level flow chart depicting a method for determining if a fuel level indicator noise is mechanical or electrical based on correlations between the fuel level indicator output and a fuel tank pressure.

FIG. 2 shows a method 200 for determining if a fuel level indicator noise is mechanical or electrical based on comparing the fuel tank level indicator output, such as output of fuel level indicator 34 of FIG. 1, for example, with a fuel tank pressure. The fuel tank pressure may be determined from a fuel tank pressure sensor, such as based on the output of FTPT 91 shown in FIG. 1. A controller may be configured with instructions stored in non-transitory memory that when executed cause the controller to perform the method 200 described below.

At 202 of method 200, the routine includes estimating and/or measuring engine operating conditions. Engine operating conditions determined may include, for example, engine speed, engine temperature, exhaust air-fuel ratio, exhaust temperature, fuel level in the fuel tank, ambient conditions such as barometric pressure and ambient temperature, etc. A fuel level indicator (FLI), such as fuel level indicator 34 of FIG. 1, may provide an estimate of the fuel level in the fuel tank to controller 12.

At 204 of method 200, it may be determined if the FLI output is noisy. The FLI output may be determined to be noisy if the output of the fuel level indicator fluctuates. In one example, if the FLI output fluctuations are greater than a threshold value (or occur at a higher than threshold frequency), then the fuel level indicator output may be determined as noisy. The threshold may be determined as 5 or 10% of average output fluctuations of the FLI output or the root-mean-square (RMS) or standard deviation of fluctuations of the output, for example. In one example, the average could be a statistical average or a weighted average of the FLI output. However, if the FLI output fluctuations are less than the threshold value (if the FLI output changes by less than 5 or 10% of average output fluctuations, for example), then the FLI output may be determined as not noisy. If the FLI output is not noisy when checked at 204, then method 200 proceeds to 212 where the FLI output may be used for adjusting engine parameters during nominal engine control.

However, if the FLI output is determined to be noisy when checked at 204, then method 200 proceeds to 206, where, in response to FLI noise, the fuel system is sealed. In one example, sealing the fuel system includes closing a canister vent valve coupling the canister to atmosphere. A canister purge valve may also be closed or maintained closed. In some examples, such as in hybrid electric vehicles where the fuel tank is coupled to the canister via a fuel tank isolation valve (herein also referred to as a vapor blocking valve), the fuel tank may be sealed by closing the FTIV. In still other examples, each of the CVV and the FTIV may be closed to seal the fuel system. The technical effect of closing the canister vent valve and/or FTIV is that the fuel tank pressure sensor (FTPT) output may be magnified by any fuel sloshing that occurs in the fuel tank. If the FLI noise is due to fuel slosh, fluctuations in the output of the fuel level indicator may correlate with the magnified output of the fuel tank pressure sensor. The outputs may be compared to determine if the FLI is degraded, such as when electrical noise is confirmed.

Once the fuel system has been sealed (such as by closing the CVV and/or the FTIV) in response to a fuel level indicator noise at 206, method 200 proceeds to 208 where both the FLI output and the fuel tank pressure as determined from the output of the fuel tank pressure sensor (FTPT) in the sealed fuel tank may be monitored. In particular, the noise in the FLI and the FTPT output, determined as the fluctuations in the respective sensor outputs, may be monitored at 208 and compared at 210 and 212. At 210, it may be checked if FTPT output noise is less than a threshold (that is, FTPT output is not noisy). As an example, the FLI may be determined to be noisy (at 204) but the FTPT may be determined to not be noisy (at 210) if the noise or fluctuations in the FLI output are higher than a threshold (the threshold may be 5 or 10% of average output fluctuations of the FLI output or the root-mean-square (RMS) or standard deviation of fluctuations of the output, for example) while the noise or fluctuations in the FTPT output are less than the threshold. As another example, the FLI may be determined to be noisy but the FTPT may be determined to not be noisy if the FLI and FTPT outputs do not have any correlation in the sealed fuel system. For example, if the FLI noise is increasing above a threshold during a given time interval, but the FTPT noise is below the threshold or remains unchanged during the same time interval, it may be inferred that the FLI and FTPT output are not correlated and the FLI noise may be determined as electrical noise.

If the fuel level indicator noise is higher than a threshold (at 204) and further if the fuel tank pressure noise is lower than the threshold (at 210), the method 200 proceeds to 214, where it may be indicated that the FLI noise is an electrical noise. Herein, the method indicates electrical noise when fuel level indicator noise and fuel tank pressure noise in the sealed fuel system are not correlated.

In response to the determination of FLI electrical noise, the method 200 proceeds to 216, wherein the routine includes indicating degradation of the fuel tank level indicator. The indicating includes setting a diagnostic code indicating electrical noise at the fuel tank level indicator. Since the electrical noise is due to a FLI component issue, by setting a diagnostic code responsive to identification of electrical noise, a vehicle operator may be advised to repair or replace the FLI sensor.

Further, after setting a diagnostic code, one or more engine operating parameters may be adjusted based on the indication of degradation at 222. For example, the controller may not rely on the output of the FLI to estimate a fuel tank fill level and may instead determine a fuel level based on a duration or distance of vehicle operation since a last refill event. In addition, a maximum torque output of the engine may be reduced (or limited) to conserve fuel usage. Further still, boost usage may be limited and EGR may be increased to reduce fuel consumption.

It will be appreciated that herein, the maximum torque output is limited to conserve fuel economy in the presence of a noisy FLI. As such, the reduction in maximum torque output responsive to the indication of noise may be different from a reduction in maximum torque output for identification of a source of noise. In alternate examples, in response to noise (e.g., vehicle or engine noise), the engine torque output may be purposely reduced, and it may be determined if the noise degrades upon reduction of the torque. If so, the torque reduction may be used to identify and pin-point the noise source.

After setting the diagnostic code at 222, method 200 proceeds to 226 where upon completion of the diagnostic routine, the fuel system may be unsealed. Unsealing the fuel system may include opening the canister vent valve if the fuel system was previously sealed by closing the canister vent valve. In another example, such as in hybrid electric vehicles, unsealing the fuel tank may include opening the FTIV if the fuel system was previously sealed by closing the FTIV. In still other examples, the fuel system may be unsealed by opening each of the CVV and the FTIV.

Returning to 210, if the output is NO then it may be determined that the noise or fluctuations in the FLI output and the FTPT output are higher than a threshold. The threshold may be 5 or 10% of average output fluctuations of the FLI output or the root-mean-square (RMS) or standard deviation of fluctuations of the output, for example. As another example, the FLI and FTPT outputs may be compared to determine if the FLI and FTPT outputs are correlated. For example, if the FLI noise is increasing above the threshold during a given time interval, and further if the FTPT noise is also increasing above the threshold during the same time interval, then it may be inferred that the FLI and FTPT outputs are correlated. As another example, if both the outputs decrease below the threshold concurrently, their outputs may be correlated. If the FLI and FTPT outputs are determined to be correlated, then method 200 proceeds to 218 wherein it may be indicated that the FLI noise is mechanical due to fuel slosh in the fuel tank. Accordingly, in response to the identification of FLI mechanical noise, a diagnostic code may not be set at 220 and engine operating parameters may not be adjusted responsive to the FLI noise at 224. For example, engine operation and boost may not be limited and the controller may continue to rely on the output of the FLI to estimate fuel level despite the indication of mechanical noise. Thus, the controller indicates mechanical noise when each of fuel level indicator noise and fuel tank pressure noise is higher than the threshold and when fuel level indicator noise and fuel tank pressure noise in the sealed fuel system are correlated. The method 200 then proceeds to 226 where the fuel system may be unsealed, as explained earlier.

In this way, the method of FIG. 2 comprises in response to fuel level indicator noise, sealing the fuel system and differentiating between electrical noise and mechanical noise of the fuel level indicator based on fuel level indicator noise relative to fuel tank pressure noise in the sealed fuel system. The differentiation is further described using graphical representations in FIGS. 3 and 4.

FIG. 3 shows an example relationship between a fuel level indicator and a fuel tank pressure sensor output in a sealed fuel system when the noise in the fuel level indicator is a mechanical noise. Plot 302 shows the fuel level indicator output. Plot 304 shows the position of the canister vent valve (CVV). Plot 306 shows the fuel tank pressure sensor (FTPT) output. For each plot, time is depicted along the x (horizontal) axis while values of each respective parameter are depicted along the y (vertical) axis.

At time $t_0$, under normal operating conditions where the engine is combusting, the canister vent valve (CVV) is open as shown by plot 304, and the fuel level indicator output is not noisy as shown by plot 302. In other words, the fluctuations in the FLI output, as shown by plot 302, are less than the threshold. In the depicted example, FLI output is determined to not be noisy based on the output being contained within band 312 having a lower limit 310 and an upper limit 308. At the same time, the FTPT output is also not noisy, as shown by plot 306, due to the FTPT output also being contained within band 312.

At time $t_1$, the FLI output becomes noisy (FLI output moves outside band 312) and continues to remain noisy until time $t_2$. In response to the FLI noise, at $t_2$, an active test may be performed to identify the source of the noise. Therein, the fuel system may be sealed by closing the canister vent valve coupled between the canister and atmosphere by actuating a canister vent solenoid. When CVV is closed at time $t_2$, as indicated by plot 304, the FTPT output becomes magnified due to fuel sloshing in the fuel tank. Between $t_2$ and $t_3$, the FLI and FTPT outputs are compared and both the outputs are determined to be noisy, and further the noise is correlated. That is, when FLI output moves outside band 312, FTPT output also moves outside band 312. Hence at $t_3$, based on fuel tank pressure fluctuations in the sealed fueled tank, fuel slosh may be determined, and based on the determination of fuel sloshing in the tank, it may be determined that the FLI noise is a mechanical noise. Accordingly, at t3, a diagnostic code may not be set. Also at $t_3$, once it is determined that the FLI noise in a mechanical noise, the CVV may be switched back to open position, as shown by plot 304, and fuel system operation may resume.

Turning now to FIG. 4, map 400 shows an example relationship between FLI and FTPT output in a sealed fuel system when the noise in the FLI is an electrical noise. Plot 402 shows the fuel level indicator output. Plot 404 shows the position of the canister vent valve (CVV). Plot 406 shows the fuel tank pressure sensor (FTPT) output. For each plot, time is depicted along the x (horizontal) axis while values of each respective parameter are depicted along the y (vertical) axis.

As described above, at time $t_0$, under normal operating conditions, the canister vent valve (CVV) is open as shown by plot 404, and the fuel level indicator output is not noisy as shown by plot 402.

At time $t_{11}$, the FLI output may become noisy as shown by the FLI output moving outside band 312. In addition, the FLI continues to remain noisy until time $t_{12}$. At the same time, the FTPT output is not noisy, as shown by plot 406, due to the FTPT output also being contained within band 312.

At $t_{12}$, in response to FLI noise, the canister vent valve is closed to seal the fuel tank system. Once CVV is closed at time $t_{12}$, as indicated by plot 404, the fuel tank pressure fluctuations may be monitored and compared with FLI noise for a duration between $t_{12}$ and $t_{13}$. In the present example, while the FLI continues to be noisy, the FTPT output in the sealed fuel system may be less than the threshold (as indicated by the output being contained within band 312). During the time between $t_{12}$ and $t_{13}$, the fluctuations or noise in the output of FLI are greater than a threshold (outside band 312) as shown by plot 402, however, the fluctuations or noise in the FTPT output as shown by plot 406 may continue to be lesser than a threshold (within band 312) indicating that the fluctuations in the FLI and FTPT output are not correlated. In addition, there is no fuel tank pressure magnification in the sealed fuel system. As a result, fuel slosh in the fuel tank, and mechanical noise at the FLI may be ruled out. Hence at $t_{13}$, it may be determined that the FLI noise is an electrical noise due to a degraded FLI (such as due to a degraded sensor or faulty wiring), and a diagnostic code may be set. At $t_3$, once it is determined that the FLI noise in an electrical noise, the CVV may be switched back to open position, as shown by plot 404, and fuel system operation may resume.

In this way, fuel level indicator noise may be more accurately and reliably identified based on correlations between fuel level indicator noise and fuel tank pressure noise in a sealed fuel system.

In one example, a system for an engine fuel system of a vehicle comprises a fuel tank including a fuel level indicator for estimating a level of fuel in the fuel tank and a pressure sensor for estimating a fuel tank pressure, a canister for receiving fuel vapors from the fuel tank, and a canister vent valve coupling the canister to atmospheric air and a controller. The controller may be configured with computer-readable instructions stored in non-transitory memory that when executed cause the controller to indicate fuel level indicator noise based on an output of the fuel level indicator. In response to the fuel level indicator noise, the controller may seal the fuel tank, compare fuel level indicator noise to fuel tank pressure sensor output in the sealed fuel tank and identify one of mechanical noise and electrical noise of the fuel level indicator based on the comparison. The canister vent valve may include a solenoid, and sealing the fuel tank may include energizing the solenoid to close the canister vent valve. The controller may be further configured to identify the fuel level indicator noise as mechanical noise when each of the fuel level indicator and the fuel tank pressure sensor output are noisy, and identify the fuel level indicator noise as electrical noise when the fuel level indicator output is noisy and the fuel tank pressure sensor output is not noisy. The controller may be further configured to compare fuel level indicator output fluctuations to fuel tank pressure sensor output fluctuations in the sealed fuel tank. The controller may include further instructions for setting a diagnostic code upon identifying the noise as electrical noise but not set a diagnostic code upon identifying the noise as mechanical noise. Upon identifying the noise as electrical noise, the controller may discontinue estimating the fuel level in the fuel tank based on the fuel level indicator.

In this way, a source of fuel level indicator noise may be reliably determined. By correlating a fuel level indicator output with a fuel tank pressure in a sealed fuel tank, fluctuations in the fuel level indicator output resulting from fuel sloshing in the fuel tank may be better distinguished from fluctuations arising from sensor or component damage. By selectively setting a diagnostic code responsive only to the identification of electrical noise and not responsive to the identification of mechanical noise, false warranty issues of the fuel level indicator may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine fuel system, comprising:
indicating degradation of a fuel tank fuel level indicator based on each of a fuel level indicator output and a fuel tank pressure sensed in a sealed fuel tank system.

2. The method of claim 1, wherein the fuel system includes a canister coupled to the fuel tank, the method further comprising, sealing the fuel tank system by closing a canister vent valve coupling the canister to atmosphere.

3. The method of claim 1, further comprising, in response to the indication of degradation, reducing a maximum torque output of the engine.

4. The method of claim 1, wherein the indicating includes indicating degradation of the fuel level indicator responsive to fluctuations in the fuel level indicator output not correlating with fluctuations in fuel tank pressure in the sealed fuel system.

5. The method of claim 1, wherein indicating degradation of the fuel tank level indicator includes setting a diagnostic code indicating electrical noise at the fuel tank level indicator.

6. The method of claim 1, further comprising indicating mechanical noise at the fuel level indicator responsive to fluctuations in the fuel level indicator output correlating with fluctuations in fuel tank pressure in the sealed fuel system.

7. The method of claim 6, wherein indicating mechanical noise includes indicating mechanical noise at the fuel level indicator due to fuel slosh in the fuel tank.

8. The method of claim 2, wherein the closing of the canister vent valve is in response to fuel level indicator noise.

9. A method for an engine fuel system, comprising:
in response to fuel level indicator noise,
sealing the fuel system; and
differentiating between electrical noise and mechanical noise of a fuel level indicator based on fuel level indicator noise relative to fuel tank pressure noise in the sealed fuel system.

10. The method of claim 9, wherein the fuel level indicator is coupled to a fuel tank, wherein the fuel system further includes a fuel vapor canister coupled to the fuel tank, and wherein sealing the fuel system includes actuating a solenoid to close a canister vent valve coupled between the canister and atmosphere.

11. The method of claim 9, wherein the differentiating includes,
indicating electrical noise when fuel level indicator noise is higher than a threshold and fuel tank pressure noise is lower than the threshold; and
indicating mechanical noise when each of fuel level indicator noise and fuel tank pressure noise is higher than the threshold.

12. The method of claim 9, wherein the differentiating includes,
indicating electrical noise when fuel level indicator noise and fuel tank pressure noise in the sealed fuel system are not correlated; and
indicating mechanical noise when fuel level indicator noise and fuel tank pressure noise in the sealed fuel system are correlated.

13. The method of claim 12, wherein indicating electrical noise includes indicating a degraded sensor of the fuel level indicator, and wherein indicating mechanical noise includes indicating fuel slosh in the fuel tank.

14. The method of claim 12, further comprising, in response to an indication of electrical noise, setting a diagnostic code, and in response to an indication of mechanical noise, not setting a diagnostic code.

15. A system for an engine fuel system of a vehicle, comprising:
a fuel tank including a fuel level indicator for estimating a level of fuel in the fuel tank and a pressure sensor for estimating a fuel tank pressure;
a canister for receiving fuel vapors from the fuel tank;
a canister vent valve coupling the canister to atmospheric air; and
a controller configured with instructions stored in non-transitory memory that when executed cause the controller to:
indicate fuel level indicator noise based on an output of the fuel level indicator; and
in response to the fuel level indicator noise,
seal the fuel tank;
compare fuel level indicator noise to fuel tank pressure sensor output in the sealed fuel tank; and
identify one of mechanical noise and electrical noise of the fuel level indicator based on the comparison.

16. The system of claim 15, wherein the canister vent valve includes a solenoid, and wherein sealing the fuel tank includes energizing the solenoid to close the canister vent valve.

17. The system of claim 15, wherein the identifying includes:
   identifying the fuel level indicator noise as mechanical noise when each of the fuel level indicator and the fuel tank pressure sensor output are noisy; and
   identifying the fuel level indicator noise as electrical noise when the fuel level indicator output is noisy and the fuel tank pressure sensor output is not noisy.

18. The system of claim 15 wherein comparing fuel level indicator noise to fuel tank pressure sensor output comprises comparing fuel level indicator output fluctuations to fuel tank pressure sensor output fluctuations in the sealed fuel tank.

19. The system of claim 17, wherein the controller includes further instructions for:
   setting a diagnostic code upon identifying the noise as electrical noise; and
   not setting a diagnostic code upon identifying the noise as mechanical noise.

20. The system of claim 19, wherein the controller includes further instructions for:
   upon identifying the noise as electrical noise, discontinuing estimating the fuel level in the fuel tank based on the fuel level indicator.

* * * * *